United States Patent

Kudra et al.

[11] Patent Number: 5,918,569
[45] Date of Patent: Jul. 6, 1999

[54] PULSED FLUIDISED BED

[75] Inventors: Tadeusz Kudra, St. Luc, Canada; Zbigniew Gawrzynski; Ryszard Glaser, both of Wroclaw, Poland

[73] Assignee: Her Majesty the Queen in right of Canada, as represented by the Minister of Natural Resources, Ontario, Canada

[21] Appl. No.: 09/066,997

[22] Filed: Apr. 27, 1998

[30] Foreign Application Priority Data

Apr. 29, 1997 [GB] United Kingdom .................... 9708600

[51] Int. Cl.⁶ ..................................................... F27B 15/10
[52] U.S. Cl. ............................ 122/4 D; 432/58; 110/245; 34/365
[58] Field of Search ......................... 432/15, 58; 110/245; 122/4 D; 34/359, 365, 576, 579, 582, 585, 594

[56] References Cited

U.S. PATENT DOCUMENTS

| 3,360,867 | 1/1968 | Sanderson . | |
|---|---|---|---|
| 4,107,851 | 8/1978 | Takacs et al. | 432/15 |
| 4,259,088 | 3/1981 | Moss | 432/58 |
| 4,284,401 | 8/1981 | Tatebayashi et al. | 432/15 |
| 4,320,089 | 3/1982 | Huttlin | 432/58 |
| 4,395,830 | 8/1983 | Lockwood | 432/15 |
| 4,628,831 | 12/1986 | Delessard et al. | 122/4 D |
| 4,787,152 | 11/1988 | Mark . | |
| 4,968,492 | 11/1990 | Delebarre et al. | 110/245 |
| 5,391,356 | 2/1995 | Thorman | 34/585 |

FOREIGN PATENT DOCUMENTS

| 1072320 | of 1980 | Canada . |
|---|---|---|
| 1271326 | of 1990 | Canada . |
| 2019871 | of 1991 | Canada . |
| 0 224 289 | of 1987 | European Pat. Off. . |
| 27 53 409 | of 1978 | Germany . |
| 92255 | of 1978 | Poland . |
| 103840 | of 1979 | Poland . |
| 153746 | of 1991 | Poland . |
| 281890 | of 1994 | Poland . |
| 1059327 | of 1967 | United Kingdom . |

OTHER PUBLICATIONS

"Drying in a Pulsed–Fluid Bed with Relocated Gas Stream"; Gawrzinski and Glazer, Drying Technology, 14(5), 1121–1172, 1996.

Buhler: PULSBED Fluid–Bed Dryer/Cooler "PULSBED"; publication date known to be prior to Apr. 29, 1997; exact publication date not known.

Buhler; PULSBED Fluid–Bed Heat Exchanger; publication date known to be prior to Apr. 29, 1997; exact publication date not known.

*Primary Examiner*—Teresa Walberg
*Assistant Examiner*—Gregory A. Wilson
*Attorney, Agent, or Firm*—Robert A. Wilkes

[57] ABSTRACT

An apparatus and method for processing materials in a batchwise or continuous fluidised bed, such as a drier, in which the fluidised bed is subdivided into a plurality of smaller areas, to each of which two separately controlled gas flows are provided. The first lower gas flow is provided to the bed preferably all of the time, and is sufficient at least to maintain the bed in an expanded state. The second higher gas flow is provided to each separate area of the bed in sequence by means of a rotary valve arrangement, and is high enough to induce fluidisation in the bed, but not high enough to induce significant solids loss by entrainment in the offtake gas. The higher flow sequence can be chosen to provide almost any desired sequence to the separate parts of the bed. The sequence can be chosen to induce a travelling wave within the bed which can be across or along the bed, and can be skewed relative to the sides of the bed. In a continuously operated bed, the travelling wave can move either co-currently with, counter-currently to, or cross-currently to, the direction of flow of the solids through the bed. This form of operation, particularly with a skewed travelling wave, improves bed operating efficiency. Since the rotary valve cannot be closed completely, problems associated with abrasive dust in the gas feed, of valve lubrication, and valve differential thermal expansion are all substantially avoided.

27 Claims, 4 Drawing Sheets

PULSED FLUIDISED BED

BACKGROUND TO THE INVENTION

The present invention relates to an apparatus and a method for processing materials in a pulsed fluidised bed system utilising a relocated and controlled gas stream, for example a dryer for particulate solids.

DESCRIPTION OF THE PRIOR ART

In a conventional fluidised bed for either batch or continuous operation, a gas flow is used both to create the fluidised bed, and to transfer either or both of heat and mass between the gas and the particulate solids: for example, in a dryer a heated fluidising gas, usually air, is used to drive off water from the solids. Under ideal conditions, the gas flow through all of the parts of the fluidised bed is the same. Ideal conditions are rarely obtained, and there are usually so-called "dead areas" within the bed through which little or no gas flows, and which are either not properly fluidised or not fluidised at all, combined with other areas in the bed through which too much gas flows. These effects combine to reduce the efficiency of heat and mass transfer within the bed, and localised excessive gas flow, either as gas channels or as gas bubbles, can result in the loss of solids entrained in the gas flow from the bed.

In a pulsed fluidised bed, the gas flow to the bed is arranged to provide velocity changes of a sequential nature, so that the fluidised bed is pulsed in a predetermined manner. The advantage of a pulsed bed is that better and more complete fluidisation is possible especially when the particulate solids are not of a uniform size.

In a simple version of this system, there is a single gas feed, and the whole of the bed is pulsed at the same time. A variation of this is to use a bed which is separated into two approximately equal areas, each of which extends essentially for the length of the bed: the bed is pulsed by feeding the fluidising gas alternately to each area of the bed. In both of these systems, due to wall effects the bed is only properly fluidised in a central portion along the length of the bed, or in the two central portions along each half of a divided bed. In a divided bed there is a central area, essentially directly above the divider in the gas chamber, which is poorly, if at all, fluidised.

In a more complex version, the bed is divided into several separate areas, and the gas flow to the bed is divided into several gas feeds, so that gas is fed to separate areas of the bed individually. Generally, each area is the width of the bed, and the separate areas are disposed in a side-by-side relationship along the bed. A valve system is provided in the gas feeds to the bed, so that by opening and closing the valves in a predetermined sequence fluidising gas is fed to each separate area within the bed. Over a complete cycle of the valve events, fluidising gas is fed to all parts of the bed. Systems of this type are described in, for example, Polish Patents 103,840; 153,746; 281,890 and 28,189. In such a system the gas velocity through any selected portion of the bed is not constant, and a pulsed effect is obtained. The performance of this type of fluidised bed is summarised by Gawrzynski and Glaser, in Drying Technology, 14(5), 1121–1172 (1996).

It has also been proposed, in Polish Patent 103,840, to provide two apparently independent gas flows to each part of the bed, both of which are apparently derived from the same main gas feed. This is proposed to be achieved by providing within the main gas flow control valve "a small duct with a high flow resistance connecting all of the chambers". By this means, the pulsed gas flow provided by a rotary valve system is proposed to be superimposed on the small constant flow provided through the small duct. However Polish patent 103,840 does not describe any apparatus including any means to achieve this effect: in the only apparatus shown the gas flow rate to each of the fluidised areas is stated to be zero when the rotary valve port feeding gas to that area of the bed is closed.

Whilst the pulsed bed system is more efficient in fluidising particulate materials having a size range, in which the particles generally range in size between an upper and a lower limit, nevertheless they are not as effective or efficient as was expected. In a single compartment pulsed bed, the solids are only properly fluidised whilst the gas is flowing. In a bed with two, or more, areas, the velocity of the gas fed to each area of the bed is at a maximum while the gas admission valve is fully open, decreases as the valve closes, and becomes zero either as the valve closes or very soon thereafter. It remains at zero whilst the valve is closed. As the valve begins to open, the gas velocity to the bed rises above zero, and returns to the maximum value either when the valve is fully open or very soon thereafter. In one known system, a rotary valve is used, which has a single outlet port by means of which gas is directed sequentially into gas ducts feeding each area of the bed. The valve is fully closed to each duct for at least half of each rotation cycle. The fact that the valve spends part of its cycle fully closed has several consequences.

First, a back pressure is generated as the valve goes through a complete cycle, which makes heating the fluidising gas difficult and inefficient, and effectively precludes using a direct fired gas or liquid fuel burner, since such direct fired devices require a reasonably constant gas velocity.

Second, for the time period over which the valve is fully closed to each duct, there is no gas flow to that area of the bed to keep the solids fluidised. This results in non-uniform fluidisation of the bed. Further, whilst in a small bed there might be enough inertia within the solids of the bed to retain a fluidised state without any gas flow, this is not the case in larger beds: during the period the gas valve is closed fluidisation can be lost in the area of the bed which is not receiving any gas, which results in poor bed performance. This can also result in solids loss through the grid below the fluidised bed and into the gas ducting.

DESCRIPTION OF THE INVENTION

This invention seeks to provide an apparatus for a pulsed fluidised bed that overcomes the known disadvantages of pulsed fluidised bed systems, and is suitable for either batchwise or continuous operation. In the apparatus according to this invention whilst the gas flow is still divided up to provide a separate feed for each area of the bed, and a valve system is used to control the gas flow to gas boxes feeding gas to each area of the bed so that a pulsed condition is obtained, the valve system is so arranged that the gas flow rate to each gas box, and therefore to each area of the bed, is never zero. Consequently, instead of varying over one complete valve cycle between zero and a desired velocity, the gas flow rate to each area of the bed varies between a lower constant value and a higher value which is sufficient to provide pulsation. The lower value is sufficient to maintain the bed in an expanded state, and should always be high enough to substantially prevent solids particles falling through the supporting grid into the gas ducting. The lower value may be insufficient to maintain fluidisation. The higher value may be higher than the velocity required for adequate fluidisation, but should be lower than the velocity at which an unacceptable level of entrainment solid particles, especially smaller size particles, occurs into the offtake gas. In the apparatus according to this invention this effect is achieved by using a rotary gas valve which is not in a completely sealed relationship with its housing: as a result of this a proportion of the gas flows around, rather than through, the valve, so that there is always a gas flow through the valve housing to each area for which the valve is in the "closed" position. When the valve is in the "open" position, the full gas flow is obtained, and a pulsed fluidised bed results.

In a first broad embodiment this invention seeks to provide an apparatus for feeding gas to a pulsed fluidised bed contained within a bed chamber having walls to contain the bed and a supporting grid beneath the bed, comprising in combination:

(i) at least one gas plenum chamber having outer walls disposed beneath and in a sealed relationship with the walls of the chamber;

(ii) internal walls within each gas plenum chamber which extend to the underside of the grid and divide the gas plenum chamber into a plurality of gas boxes;

(iii) at least one gas feed chamber attached to a wall of each gas plenum chamber;

(iv) a valve means in the gas path between each gas feed chamber and each plenum chamber including a rotating disc valve having at least one valve port and a stationary valve seat having flow apertures which provide a gas flow path between the gas feed chamber and each gas box within the plenum chamber as the valve rotates; and (v) a valve rotation means;

wherein:

(a) the disc valve is separated from the valve seat and rotates in a plane substantially parallel to the seat;

(b) the disc valve port has an effective diameter D;

(c) the stationary valve seat has an effective diameter of at least D; and (d) the valve means includes at least one bypass port in addition to the disc valve port providing a gas flow to all of the gas boxes sufficient to maintain the bed in an expanded state, and to substantially prevent solids loss from the bed.

In a first preferred embodiment:

(a) the disc valve is separated from the valve seat by an axial distance b, and rotates in a plane substantially parallel to but spaced from the seat;

(b) the disc valve port has an effective diameter D;

(c) the stationary valve seat has an effective diameter of at least D; and (d) the maximum value of b is 0.2 D, and the minimum value of b provides a gas flow sufficient to maintain the bed in an expanded state, and to substantially prevent solids loss from the bed.

In a second preferred embodiment:

a) the disc valve rotates in a plane substantially parallel to but spaced from the seat;

(b) the disc valve port has an effective diameter D;

(c) the stationary valve seat has an effective diameter greater than D; and (d) the disc valve peripheral diameter is smaller than the diameter D of the stationary valve seat by an amount b' so as to provide an annular by pass port around the periphery of the disc valve which provides a gas flow sufficient to maintain the bed in an expanded state, and to substantially prevent solids loss from the bed.

In a third preferred embodiment:

(a) the disc valve is separated from the valve seat by an axial distance b, and/or a radial distance b', and rotates in a plane substantially parallel and close to but spaced apart from the seat;

(b) the disc valve port has an effective diameter D;

(c) the disc valve further includes at least one subsidiary port of area b";

(d) the stationary valve seat has an effective diameter of at least D; and (e) the separation distance b and/or b' between the disc valve and the valve seat, and the area b" of the subsidiary ports combined provide a bypass port which provides a gas flow sufficient to maintain the bed in an expanded state, and to substantially prevent solids loss from the bed.

Preferably the, or each, disc valve has one or two ports. More preferably, the or each disc valve has one port.

Preferably, in the first preferred embodiment, the disc valve has an effective diameter D, a port of area A, and b is less than about 0.2 D.

Preferably, in the second preferred embodiment, the disc valve has an effective diameter D, a port of area A, and b' is less than about 0.36 D.

Preferably, the disc valve has an effective diameter D, a single port of area A, and b, b' and/or b" separately or in combination as appropriate provide a bypass port or ports having a total area corresponding to a separation between the disc valve and the valve seat of about $A/\pi D$.

In a second broad embodiment this invention seeks to provide a method of pulsed fluidising a fluidised bed which comprises:

(i) providing an independently controlled gas flow to different separate areas of the bed;

(ii) controlling the gas flow to provide to each area of the bed a lower gas flow level sufficient to maintain the fluidised bed in an expanded state, and sufficient to substantially prevent solids loss from the bed; and iii) further controlling the gas flow to provide separately in a repeating predetermined sequence, and at a predetermined frequency, to each separate area of the bed a higher gas flow sufficient to fluidise the bed and insufficient to cause solids loss by entrainment in the gas flow from the bed.

Preferably, the higher gas flow is provided in sequence to each area of the bed from one end to the other. More preferably, the higher gas flow is provided in sequence to each area of the bed from one end to the other, and the repeating sequence starts adjacent one end of the bed to induce a travelling wave in the fluidised solids of the bed.

Preferably, the separate areas of the bed extend transversely across the bed.

Preferably, the transverse separate areas of the bed are subdivided along the length of the bed, and a separate gas flow is provided to each area of the bed. More preferably, the higher gas flow is provided in sequence to each area of the bed from one end to the other, and the repeating sequence starts adjacent one end of the bed to induce a travelling wave in the fluidised solids of the bed. Most preferably, the higher gas flow is provided in sequence to each area of the bed from one end to the other, and the repeating sequence starts adjacent one end of the bed to induce a skewed travelling wave in the fluidised solids of the bed.

This arrangement has several advantages.

Since there is always a gas flow through the bypass port or ports sufficient to maintain the bed in an expanded state, solids loss through the grid during the low gas flow periods is minimized, and preferably is substantially eliminated by careful choice of the combination of the disc valve port area A, the gas flow allowed by the bypass port or ports (for example by the careful choice of a value for the distances b or b', and/or the area b" of at least one bypass port), and the gas flow characteristics. The lower gas flow allows more heat to be supplied to the solids, for example to dry a solid material, when compared to the use of only a higher gas flow. It can thus also be seen that although b and b' are essentially distances, and b" is essentially an area, the values for these three parameters are directly inter-related since they jointly define the cross-sectional area of the bypass for the low gas flow.

Since a more homogenous structure is obtained in the fluidised bed, the overall efficiency of heat and mass transfer within the bed is improved. Whilst the separate areas of the bed can be arranged to receive gas in any chosen sequence, certain arrangements of the separate bed areas and of the gas pulse sequencing are more effective than others.

It is preferred that the areas each extend transversely across the bed, rather than along it, and are thus in a side-by-side relationship. In a large bed, such transverse areas can be subdivided. The gas plenum chamber internal arrangements providing the gas boxes preferably are arranged so that as the disc valve rotates the flow of pulsing gas is fed sequentially to succeeding areas along the length of the bed. When the pulsing gas is fed to the gas boxes in a sequence along the bed, the valve rotation rate can be set so that what may be termed a travelling wave is set up within the bed. Such a travelling wave can be set up more or less perpendicular to an axis of the bed, or it can be skewed relative to the axis of the bed.

This provides a hitherto unavailable level of flexibility. For example, in a batchwise operated square or rectangular bed, the travelling wave can be arranged to be more or less perpendicular to the side of the bed, or it can be at a skewed angle to the side of the bed. In a continuously operated bed, the travelling wave can be either in the same direction as, in the reverse direction to, or across the direction that, the solids flow through the bed. Thus the travelling wave in a continuous bed can move co-currently, counter-currently, or cross-currently to the solids flow to through the bed, and can be either more or less perpendicular, more or less parallel, or skewed relative to the direction of fluids flow in the bed. A skewed travelling wave is obtained, as is explained in more detail below, by the use of two rotary valves, each controlling the gas flows to adjacent parts of the bed.

Since a skewed travelling wave is not perpendicular to the bed chamber walls, it is also need not be perpendicular to the walls beneath the grid separating the gas plenum chamber into the gas boxes: it is convenient to use a conventional more or less rectangular construction for the gas boxes. This has the advantage that fluidisation and pulsation are both better maintained as the angled travelling wave passes over the gas box walls beneath the supporting grid.

For a large lengthy bed it is possible to coordinate the valve events in each of several gas plenum chambers so that there is more than one travelling wave moving through the bed.

As the rotary disc valve is never fully closed, in the sense that no gas at all can pass through it, the disc valve only needs to be close to, and not in a gas tight sealing relationship with, the valve seat. The disc valve can be spaced axially away from the seat. Alternatively, it can be located close to, but not in a sealing relationship with, the seat and a radial clearance gap provided around its circumference. This greatly simplifies valve construction, as it eliminates the sealing problems caused by differential thermal expansion, and the problems of both maintaining an adequate gas tight seal in a hot valve, and providing adequate lubrication of the valve faces that are in sliding contact. This also facilitates the use of furnace offtake gasses, or other combustion gasses, as a hot gas feed for the bed, as these can often contain abrasive dusts entrained in the hot gas.

Finally, as there is always a flow of gas through the valve, since even for a small bed the valve is never completely closed, the use of an oil or gas fired burner as the gas heating means is considerably simplified.

BRIEF DESCRIPTION OF THE DRAWINGS

Embodiments of the invention will now be described with reference to the attached drawings in which.

DESCRIPTION OF THE EMBODIMENTS

In the following description, reference is made to a continuously operated bed. The same concepts are equally applicable to a batchwise operated bed.

Figure 1:
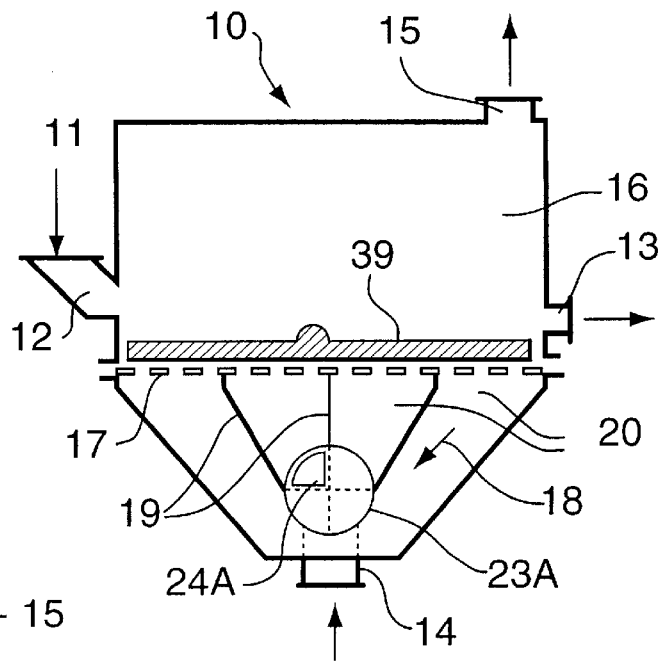
FIG. 1 shows a schematic side sectional view of a pulsed fluidised bed apparatus.
Figure 2:
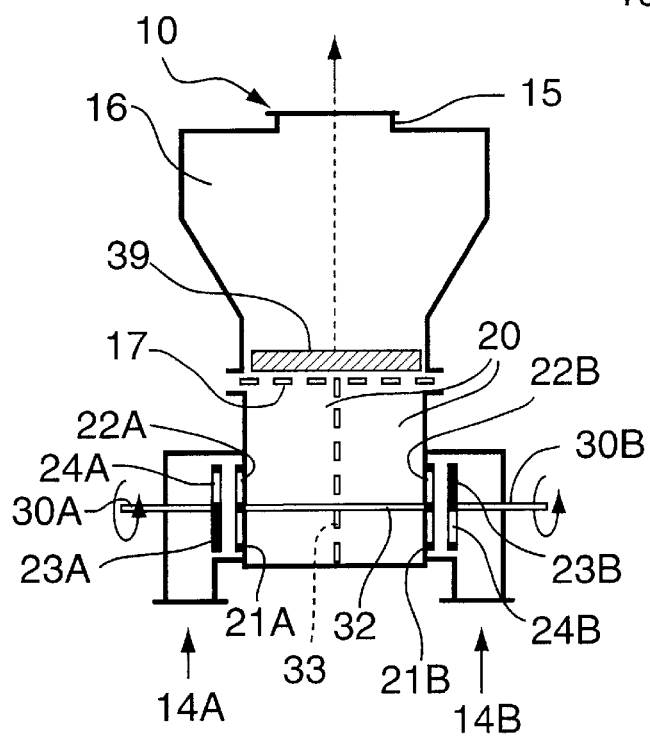
FIG. 2 shows a schematic front section view of the apparatus of FIG. 1.

Referring first to FIGS. 1 and 2 the apparatus shown generally at 10 is suitable for drying a wet particulate feed. The particulate feed material enters the apparatus in line 11 at the feed point 12 to form the fluidised bed 39, and is discharged as a dried product through line 13 from the bed. Hot gas enters the apparatus through duct 14, and cooler wet gas leaves through duct 15.

The part of the drier which contains the fluidised bed is more or less conventional, and comprises a bed chamber 16 which is substantially rectangular, with a conventional supporting grid 17, which separates the bed chamber from the gas plenum 18. In operation, the bed of particulate material is disposed above the grid 17, and is fluidised by the gas flowing through the grid 17. The gas plenum 18 is divided by internal walls 19 into several gas boxes 20 which extend to the underside of the grid 17, thus directing the air flow to several contiguous parts of the bed. The side walls of the plenum each include rotary gas distribution disc valve seats 21A and 22B, with apertures 22A and 21B. Adjacent the valve seats are located disc valves 23A and 23B, which have ports 24A and 24B. The disc valves 23A and 23B are rotated by means of the shafts 30A and 30B: if desired, as shown ghosted at 32, a single drive shaft can be used. As each valve rotates, gas is fed in sequence to each of the gas boxes 20, and thence through the grid 17 into the separate areas of the fluidised bed.

As shown in FIG. 1 the four gas boxes each feed areas of the bed that are effectively the same size, and the gas flow to each is therefore more or less the same. In a drier such as is shown, the solids become lighter as they move along the bed from the feed point 12 to the output line 13 as the water is removed, and consequently the gas flow required for optimum bed conditions also decreases: if desired the gas flow can be adjusted by placing the walls 19 to accommodate this change.

Figure 4:
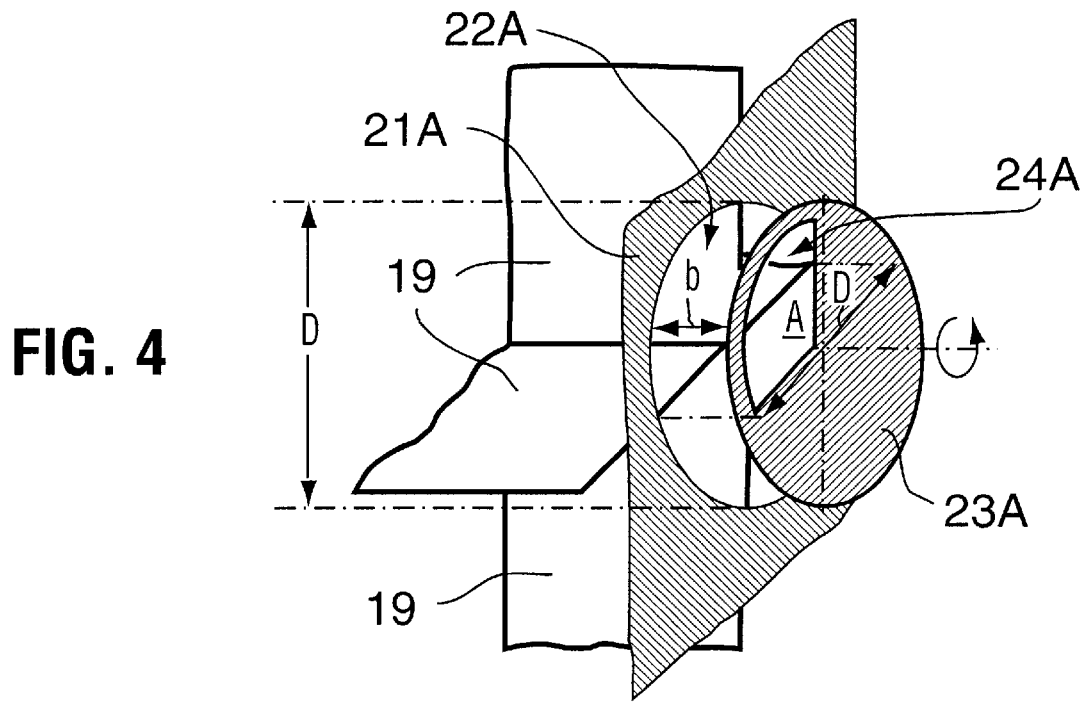
FIG. 4 shows an exploded view of part of a rotary gas distribution valve.

The valve discs 23A, 23B are each separated a short axial distance b from the valve seats 21A, 21B. As will be discussed below in more detail, this is not the only possible arrangement. In this case, the valve disc rotates in a plane parallel to but separated a short distance from the valve seat. The apertures 22A, 22B are substantially circular, and more or less match the rotating port in the valve discs (see FIG. 4). Each of the valve disc ports 24A, 24B has an area A. The values of A and b are chosen to provide the desired gas flow rates. The valve seat aperture has an effective diameter D, which is substantially the same size as the periphery of the circle swept by the valve ports 24A, 24B during a complete rotation of the valve (see also FIGS. 6 and 7). In this example, the area of the valve seat aperture will be approximately 4A. Whilst the precise values for the separation, port area and valve diameter are primarily determined by the conditions of use of the apparatus it has been found that b should be at maximum 0.2 D, and preferably b is about $A/\pi D$.

It is thus apparent that in this arrangement, the required bypass port is provided by the axial separation distance b between the rotating disc valve and its static seat. Other arrangements are possible.

Figure 8:
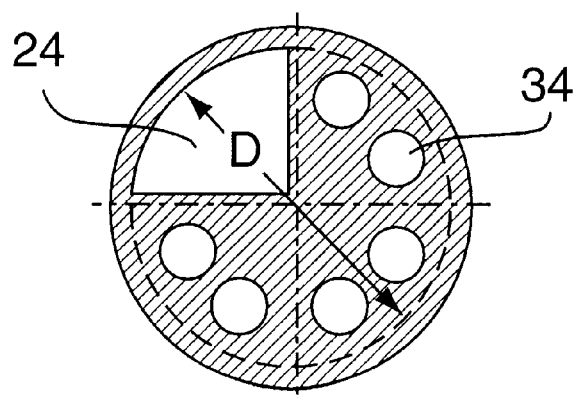
FIG. 8 shows an alternative form of disc valve.

An alternative form of disc valve is shown in FIG. 8. Whilst this disc also does not require a gas tight sealing relationship with its cooperating valve seat, in addition to a port 24, the disc also includes a series of subsidiary ports 34 which can be sized to provide the required bypass gas flow path into the gas boxes for which the valve is in the "closed" position. Alternatively, ports of this type can be used to supplement the gas flow through a separation gap between the disc valve and the valve seat, so that with a disc valve of this type b can be smaller. This form of valve is of use where space constraints limit the available value of b.

Figure 7:
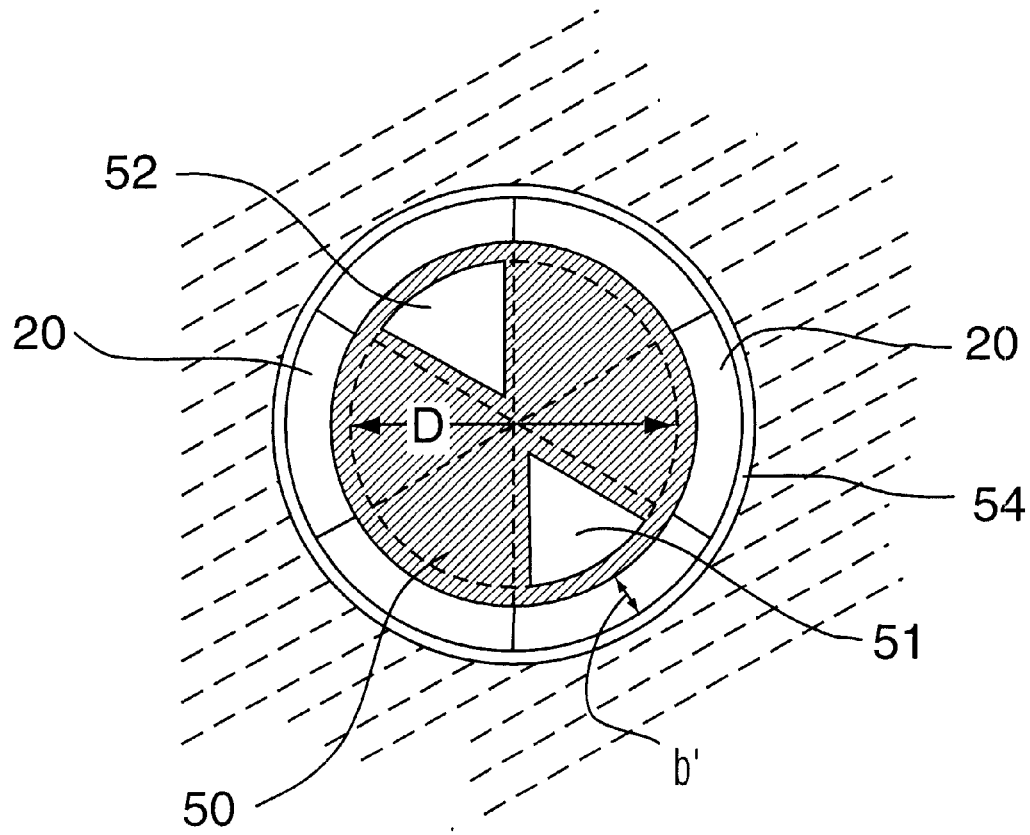
FIG. 7 shows a disc valve with two ports.

A further alternative form of disc valve is shown in FIG. 7. In the valve shown, the disc valve 50 has two ports 51,52 which control the gas flow to six separate gas boxes 20, which in their turn provide a gas flow to six separate bed areas; the two disc valve ports are always open to two separate gas boxes at once. In this valve, the rotating disc valve 50 is located close to, but not in a sealing relationship with, the plane of the static valve seat 54. The effective diameter D of the disc valve 50 is therefore significantly less than the diameter of the static valve port, as the rotating disc valve 50 and the static valve seat are separated by the radial annulus of width b'. This annulus comprises the required bypass port, and its width b' is chosen to provide the required level of gas flow. This arrangement is particularly useful where for reasons of space it is desirable to recess the whole valve somewhat into the side of the plenum chamber.

Figure 3:
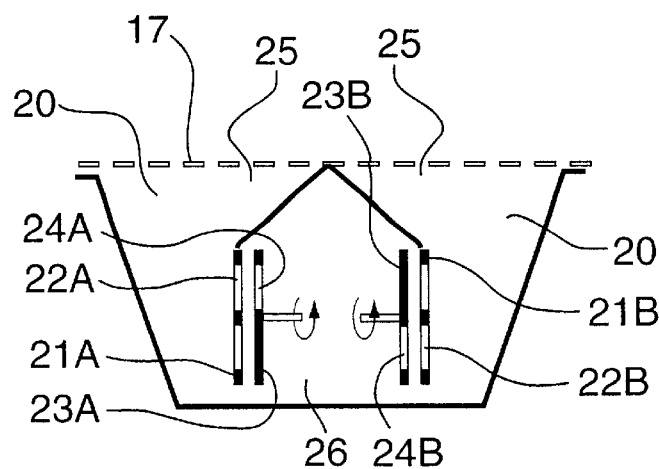
FIG. 3 shows an alternative view of a gas chamber including partitions.
Figure 5:
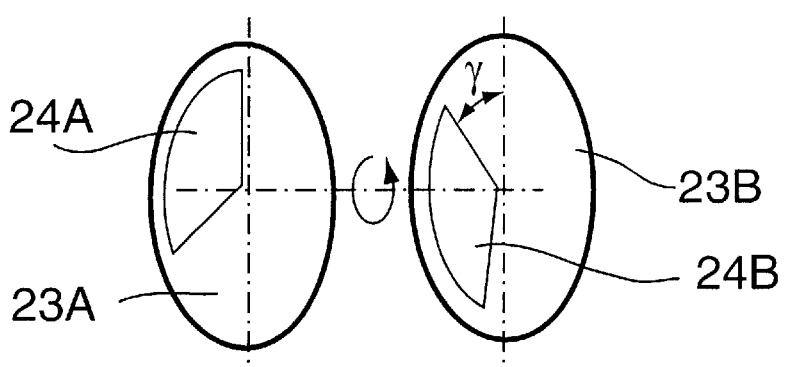
FIGS. 5 and 6 show a schematic views of two disc valves indicating relative valve port locations.

As shown in FIGS. 1, 2 and 3 the valve ports 24A and 24B are coaxially located relative to each other, and can be described as being in phase with each other. Other arrangements are possible. One is shown in FIG. 5, in which the two ports are offset by the phase angle γ. For two single port disc valves as shown in FIG. 5 this angle can be chosen to be any value between zero and 180°. Another is shown in FIG. 6, in which the valves are not coaxial, and are offset along the length of the bed; the two valve ports can still be offset by the same relative phase angle γ.

Figure 9:
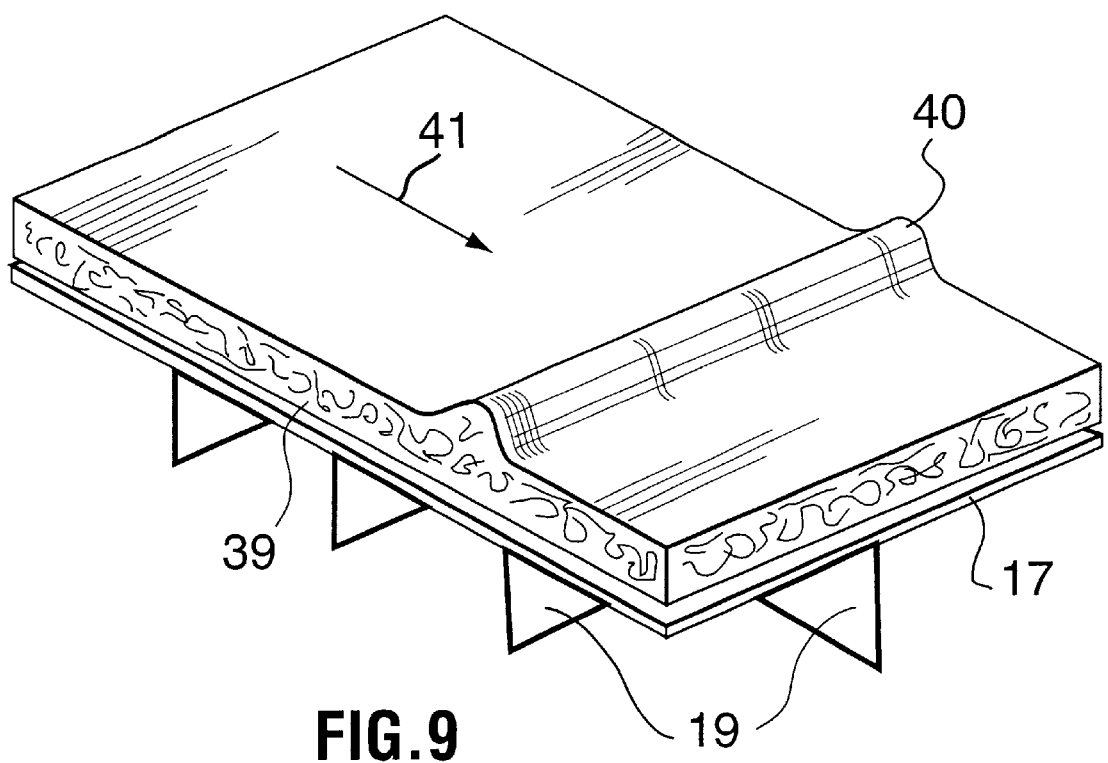
FIGS. 9 and 10 each show schematically travelling waves in a pulsed fluidised bed.
Figure 10:
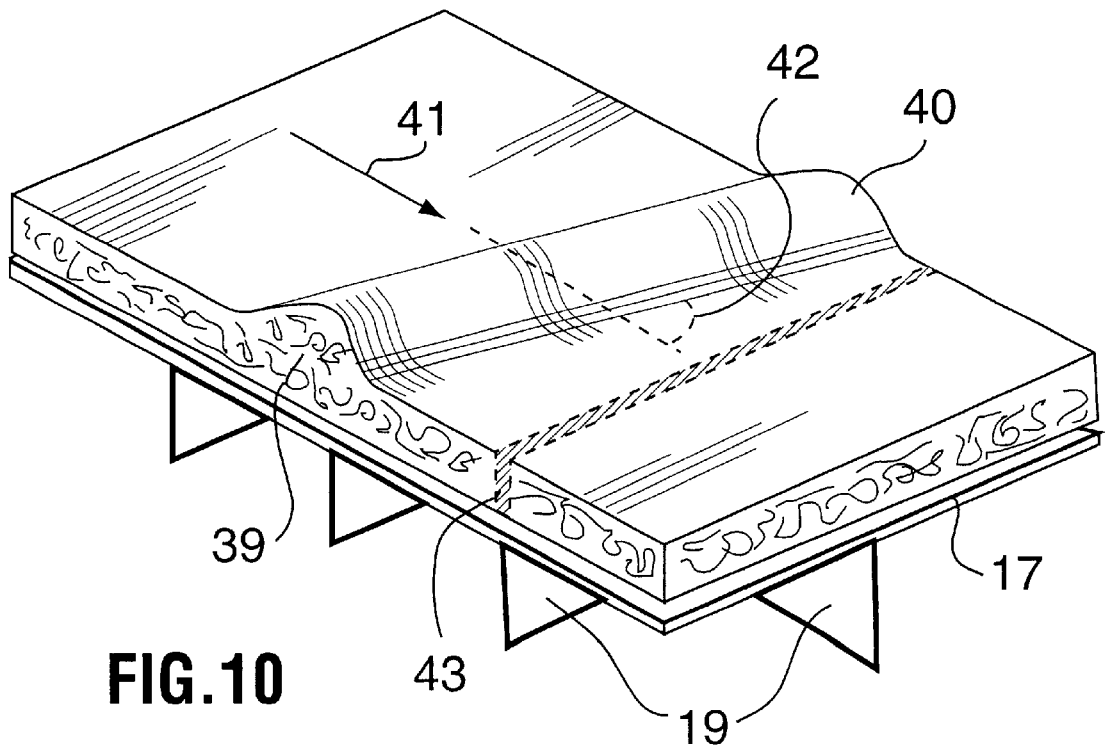

In FIG. 5 if the phase angle is zero, then as is shown in FIG. 9 a travelling wave 40 within the bed 39 will be more or less across the bed, and perpendicular to its direction of motion 41 along the bed. But if the phase angle is not zero, the travelling wave 40 becomes skewed at an angle as at 42 as shown in FIG. 10. The advantage of a skewed travelling wave is that the pulsed area travels gradually over the narrow area 43 directly above the internal divisions 19 in the gas chamber, rather than all at once. This appears to be beneficial in minimising any wall effects that might be associated with the areas 43 of the bed above the walls 19 which cannot receive any gas feed. In order to obtain optimum pulsation within the bed it appears that the phase angle γ is preferably equal to 360°÷n, in which n is the number of gas boxes to which gas is fed during one complete rotation of the valve.

Figure 6:
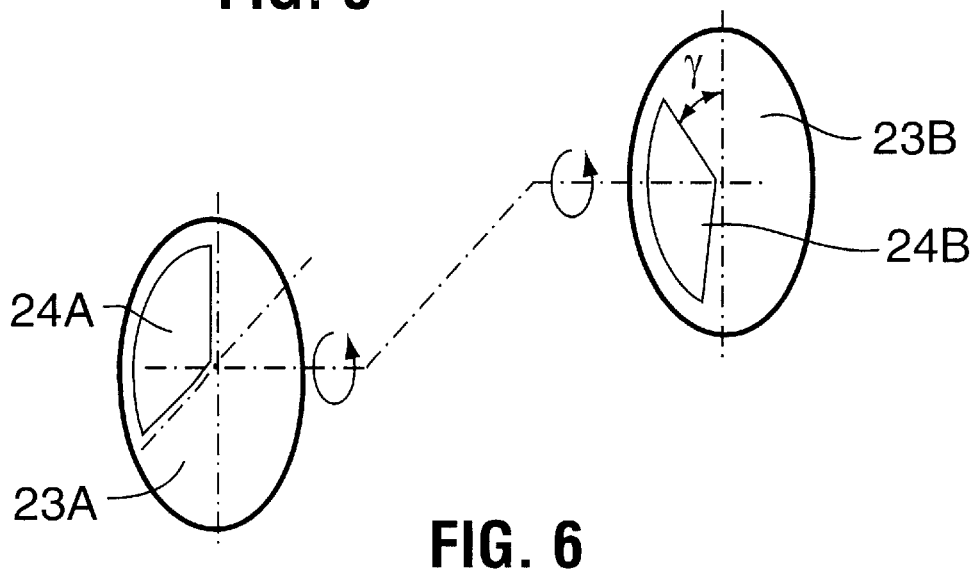

In FIG. 6 if the phase angle is zero, then the travelling wave is skewed, as shown in FIG. 10. The phase angle can be adjusted to eliminate this, and to bring the travelling wave into the position shown in FIG. 9.

In the arrangements of either FIG. 5 or 6 it is possible to alter the skew angle during operation by changing the phase angle, and even to have a non-constant phase angle by driving the two—or more—rotary valves at similar but different rotational speeds. The direction of movement of the travelling wave is also controlled by the direction of rotation of the valve or valves: reversing the direction of rotation will reverse the direction of movement.

In FIGS. 1 and 2 the gas feed chambers 14A and 14B are on the sides of the plenum chamber 18. A more compact arrangement for the rotary valves is shown in FIG. 3, in which a single feed chamber 26 is used for the two valves 23A, 23B. This arrangement requires less space, and involves less heat losses from the gas. It is also possible to place a dividing wall 33 in the plenum chamber at right angles to the axis of the rotary valves which has the effect of doubling the number of gas boxes, and hence the number of separately pulsed areas in the bed. Such a dividing wall can be solid or perforated; if a perforated wall is used it appears that the open area should be less than 5%, and preferably about 3%, of the area of the dividing wall.

As shown in FIG. 8 it is possible to provide the disc valve with a single port 24, and more than one bypass port 34. In this arrangement, the area b" of the ports 34 is governed by more or less the same considerations as those set out above for a valve with a radial gap b or an axial gap b'. In a valve of this type, there need not be any separation between the disc and the seat (i.e. both b and b' are both small and approaching zero); in practice since the rotary disc is not required to be in a gas tight relationship with the valve seat, there will generally be a small separation between the valve and the seat, thus avoiding thermal expansion and lubrication problems. If desired, this small gap can be taken into account when determining the value for b".

In this form of valve, it is also possible to use one disc valve to feed pulsing gas to more than four bed areas. However, in practice it is found that there are limitations on both how many ports can be used, and on how many areas of a bed can be pulsed using one valve. If the number of ports is increased, or the number of areas is increased, or both, the disc valve becomes too large and the gas ducting becomes more complex than is necessary. Even for a very large bed, it appears to be desirable to divide the bed into sets of four areas, and to control the gas flow to each set of four with one single port disc valve arrangement. For a large bed, the valve events both across and along the bed can be coordinated by several well known control means.

In the apparatus described above, the frequency of pulsation of the bed is determined by the rotational speed of the valve: a pulse is administered to each area of the bed during the period that the valve is fully open to that area of the bed. It appears that a speed of rotation which gives a pulsing rate of from about 1 Hz to about 50 Hz is generally effective, and for the majority of materials a pulse rate of from about 4 Hz to about 15 Hz appears to be adequate; in many cases a pulse rate of from about 8 Hz to about 10 z appears to be optimum.

What we claim is:

1. An apparatus for feeding gas to a pulsed fluidised bed contained within a bed chamber having walls to contain the bed and a grid beneath the bed, comprising in combination:
   (i) at least one gas plenum chamber having outer walls disposed beneath and in a sealed relationship with the walls of the chamber;
   (ii) internal walls within each gas plenum chamber which extend to the underside of the grid and divide the gas plenum chamber into a plurality of gas boxes;
   (iii) at least one gas feed chamber attached to a wall of each gas plenum chamber;
   (iv) a valve means in the gas path between each gas feed chamber and each plenum chamber including a rotating disc valve having at least one valve port and a stationary valve seat having flow apertures which provide a gas flow path between the gas feed chamber and each gas box within the plenum chamber as the valve rotates; and
   (v) a valve rotation means;
   wherein:
      (a) the disc valve is separated from the valve seat and rotates in a plane substantially parallel to but spaced from the seat;
      (b) the disc valve port has an effective diameter D;
      (c) the stationary valve seat has an effective diameter of at least D; and
      (d) the valve means includes at least one bypass port in addition to the disc valve port providing a gas flow to all of the gas boxes sufficient to maintain the bed in an expanded state, and to substantially prevent solids loss from the bed.

2. An apparatus according to claim 1 wherein:
   (a) the disc valve is separated from the valve seat by an axial distance b, and rotates in a plane substantially parallel to but spaced from the seat;
   (b) the disc valve port has an effective diameter D;
   (c) the stationary valve seat has an effective diameter of at least D; and
   (d) the maximum value of b is 0.2 D, and the minimum value of b provides a gas flow sufficient to maintain the bed in an expanded state, and to substantially prevent solids loss from the bed.

3. An apparatus according to claim 1 wherein:
   (a) the disc valve rotates in a plane substantially parallel to but spaced from the seat;
   (b) the disc valve port has an effective diameter D;
   (c) the stationary valve seat has an effective diameter greater than D; and
   (d) the disc valve peripheral diameter is smaller than the diameter D of the stationary valve seat by an amount b' so as to provide an annular by pass port around the periphery of the disc valve which provides a gas flow sufficient to maintain the bed in an expanded state, and to substantially prevent solids loss from the bed.

4. An apparatus according to claim 1 wherein:
   (a) the disc valve is separated from the valve seat by an axial distance b, and/or a radial distance b', and rotates in a plane substantially parallel and close to but spaced apart from the seat;
   (b) the disc valve port has an effective diameter D;
   (c) the disc valve further includes at least one subsidiary port of area b";
   (d) the stationary valve seat has an effective diameter of at least D; and
   (e) the separation distance b and/or b' between the disc valve and the valve seat, and the area b" of the subsidiary ports combined provide a bypass port which provides a gas flow sufficient to maintain the bed in an expanded state, and to substantially prevent solids loss from the bed.

5. An apparatus according to claim 1 wherein the, or each, disc valve has one port.

6. An apparatus according to claim 2 wherein the, or each, disc valve has an effective diameter D, a single port of area A, and b is about $A/\pi D$.

7. An apparatus according to claim 3 wherein the, or each, disc valve has an effective diameter D, a single port of area A, and b' is about $A/\pi D$.

8. An apparatus according to claim 4 wherein the, or each, disc valve has an effective diameter D, a single port of area A, and b, b' and/or b" separately or in combination as appropriate provide a bypass port or ports having a total area corresponding to a separation between the disc valve and the valve seat of about $A/\pi D$.

9. An apparatus according to claim 1 including one plenum chamber.

10. An apparatus according to claim 1 including at least two plenum chambers with separate rotary valve means in each plenum chamber.

11. An apparatus according to claim 10 including at least two plenum chambers separated by a longitudinal common wall with separate rotary valve means in each plenum chamber.

12. An apparatus according to claim 11 wherein the common wall includes perforations.

13. An apparatus according to claim 12 wherein the perforations provide an open area of less than about 5%.

14. An apparatus according to claim 12 wherein the perforations provide an open area of about 3%.

15. An apparatus according to claim 11 wherein the rotary valve ports are displaced relative to each other by a phase angle γ having a value between zero and 180°.

16. An apparatus according to claim 15 wherein the rotary valve means are substantially coaxial, and the phase angle γ is 360°÷n, in which n is the number of gas boxes to which gas is fed during one complete rotation of the valve.

17. An apparatus according to claim 1 wherein the valve rotation means provides a frequency of pulsation of each area of the fluidised bed of from about 1 Hz to about 50 Hz.

18. An apparatus according to claim 1 wherein the valve rotation means provides a frequency of pulsation of each area of the fluidised bed of from about 4 Hz to about 15 Hz.

19. An apparatus according to claim 1 wherein the valve rotation means provides a frequency of pulsation of each area of the fluidised bed of about 10 Hz.

20. A method of pulsed fluidising a fluidised bed which comprises:
   (i) providing an independently controlled gas flow to different separate areas of the bed;
   (ii) controlling the gas flow to provide to each area of the bed a lower gas flow level sufficient to maintain the fluidised bed in an expanded state, and sufficient to substantially prevent solids loss from the bed; and
   (iii) further controlling the gas flow to provide separately, in a repeating predetermined sequence and at a predetermined frequency to each area of the bed a higher gas flow sufficient to fluidise the bed and insufficient to cause solids loss by entrainment in the gas flow from the bed.

21. A method according to claim 20 wherein the separate areas of the bed extend either transversely across, or longitudinally along the bed.

22. A method according to claim 21 wherein the higher gas flow is provided in sequence to each area of the bed either along or across the bed.

23. A method according to claim 22 wherein the higher gas flow induces a travelling wave in the fluidised solids of the bed.

24. A method according to claim 22 wherein the higher gas flow induces a skewed travelling wave in the fluidised solids of the bed.

25. A method according to claim 20 wherein the frequency is from about 1 Hz to about 50 Hz.

26. A method according to claim 20 wherein the frequency is from about 4 Hz to about 15 Hz.

27. A method according to claim 20 wherein the frequency is about 10 Hz.

* * * * *